US006465794B1

(12) United States Patent
Suzuki

(10) Patent No.: US 6,465,794 B1
(45) Date of Patent: Oct. 15, 2002

(54) RADIATION IMAGE STORAGE PANEL

(75) Inventor: Hideki Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/497,517

(22) Filed: Feb. 4, 2000

(30) Foreign Application Priority Data

Feb. 4, 1999 (JP) .......................................... 11-027300
Aug. 18, 1999 (JP) .......................................... 11-231043

(51) Int. Cl.[7] ............................ G21K 4/00; B32B 5/16; G03B 42/02

(52) U.S. Cl. .................................... 250/484.4; 250/581

(58) Field of Search ............................ 250/484.4, 581, 250/582, 584, 585, 586, 588

(56) References Cited

U.S. PATENT DOCUMENTS 4,845,369 A * 7/1989 Arakawa et al. ......... 250/484.1
4,977,327 A * 12/1990 Arakawa et al. ......... 250/484.1
5,151,604 A 9/1992 Kohda et al.
6,232,611 B1 * 5/2001 Suzuki et al. ............ 250/483.1
2001/0022349 A1 * 9/2001 Takahashi ................ 250/484.4

FOREIGN PATENT DOCUMENTS

EP 0 223 062 A2 5/1987
EP 0 274 126 A1 7/1988
EP 0 579 016 A1 1/1994

* cited by examiner

*Primary Examiner*—Constantine Hannaher
*Assistant Examiner*—Albert Gagliardi
(74) *Attorney, Agent, or Firm*—Sughrue Mion, PLLC

(57) ABSTRACT

In a radiation image storage panel composed of a stimulable phosphor layer which gives stimulated emission upon irradiation with stimulating rays and a protective film provided thereon, and optionally further a back protective film, a transparent support film, and an undercoating layer, the protective film contains electroconductive acicular fine particles, has a surface electric resistivity of $10^{14}\Omega$ or less, and shows a transmittance of 70% or more at a peak wavelength of the stimulated emission.

14 Claims, 1 Drawing Sheet

RADIATION IMAGE STORAGE PANEL

FIELD OF THE INVENTION

The present invention relates to a radiation image storage panel employable in a process for reading a radiation image in the radiation image recording and reproducing methods, by a single- or double-side reading system.

BACKGROUND OF THE INVENTION

As a method replacing a conventional radiography, a radiation image recording and reproducing method utilizing a stimulable phosphor was proposed, and is practically employed. The method employs a radiation image storage panel (i.e., stimulable phosphor sheet) comprising a stimulable phosphor, and comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The panel thus treated is subjected to a step for erasing a radiation image remaining therein, and then stored for the next recording and reproducing procedure. Thus, the radiation image storage panel can be repeatedly employed.

In this method, a radiation image is obtainable with a sufficient amount of information by applying a radiation to the object at a considerably smaller dose, as compared with a conventional radiography using a combination of a radiographic film and radiographic intensifying screen. Further, the method is very advantageous from the viewpoints of conservation of resource and economic efficiency because the radiation image storage panel can be repeatedly used while the radiographic film is consumed for each radiographic process in the conventional radiography.

The radiation image storage panel has a basic structure comprising a support and a stimulable phosphor layer provided thereon. However, if the stimulable phosphor layer is self-supporting, the support may be omitted. On the free surface (surface not facing the support) of the phosphor layer, a protective film is generally placed to keep the phosphor layer from chemical deterioration or physical shock.

The stimulable phosphor layer basically comprises a binder and stimulable phosphor particles dispersed therein, but it may consist of agglomerated phosphor particles without binder. The stimulable phosphor layer containing no binder can be formed by deposition process or firing process. Further, the stimulable phosphor layer comprising agglomerated phosphor soaked with a polymer is also known. In any of stimulable phosphor layers, the stimulable phosphor emits stimulated emission when excited with stimulating rays after having been exposed to a radiation such as X-rays. Accordingly, the radiation having passed through an object or radiated from an object is absorbed by the phosphor layer of the radiation image storage panel in proportion to the applied radiation dose, and a radiation image of the object is produced in the storage panel in the form of a radiation energy-stored image. The radiation energy-stored image can be released as stimulated emission by sequentially irradiating the storage panel with stimulating rays. The stimulated emission is then photoelectrically detected to give electric signals, so as to reproduce a visible image from the electric signals.

The radiation image recorded in the storage panel is generally read by the steps of irradiating stimulating rays on the front surface side (phosphor layer side) of the panel, collecting light emitted by the phosphor particles by means of a light-collecting means from the same side, and photoelectrically converting the light into image signals. A system for reading the image from one side of the panel in this manner is referred to as "single-side reading system". However, there is a case that the light emitted by the stimulable phosphor particles should be collected from both sides (i.e., from the front and the back surface sides) of the storage panel. For instance, there is a case that the emitted light is desired to be collected as much as possible. There is also a case that the radiation image recorded in the phosphor layer varies along the depth of the phosphor layer, and that detection of the variation is desired. A system for reading the image from both sides of the storage panel is referred to as "double-side reading system".

A radiation image storage panel employed in the double-side reading system, as well as a radiation image storage panel employed in the single-side reading system, is desired to be as sensitive as possible and to provide an image of high quality (high sharpness, high graininess, etc.).

While repeatedly used (particularly, while repeatedly transferred for reading and erasing in the reading system), static electricity is deposited on the radiation image storage panel. Since the deposited static electricity gives image artifacts, the storage panel having static electricity thereon is apt to give an reproduced radiation image of poor quality. For avoiding the impairment with electrification, it has been proposed to incorporate various antistatic agents into the storage panels for single-side reading system. For example, Japanese Patent Publication H6-31911 describes a radiation image storage panel having at least a member containing fibrous electroconductive material (mean length: 5 to 50 $\mu$m, mean diameter: 0.1 to 1.0 $\mu$m), and Japanese Patent Provisional Publication H4-2999 also discloses a radiation image storage panel containing electroconductive zinc oxide whiskers (mean length: 3 to 150 $\mu$m, mean diameter: 0.3 to 3 $\mu$m).

The panel for single-side reading system having a protective film containing conventional conductive material (such as zinc oxide whiskers) is satisfactory from the viewpoint of antistatic property. However, it often gives an image of very poor quality because the conductive material absorbs a portion of the stimulated emission. For example, a europium activated alkaline earth metal fluoride halide phosphor (which is a representative stimulable phosphor) emits stimulated emission having a peak at approx. 400 nm, while the conventional conductive material absorbs light in the shorter wavelength part of that stimulated emission. Consequently, the amount of the observed emission decreases to impair the resultant image quality. Particularly in a radiation image storage panel for double-side reading system, the conductive material contained in any layer or film reduces the amount of the observed emission to seriously impair the image quality.

SUMMARY OF THE INVENTION

It is an object of the present invention to provide a radiation image storage panel for the use in the single- or double-side reading system. The target radiation image storage panel has an excellent antistatic property and gives a reproduced radiation image of high quality.

The present inventor has studied about the conventional antistatic agents such as zinc oxide whiskers, and finally has found the following fact. The conventional antistatic agent absorbs light in the shorter wavelength part of the stimulated emission, and accordingly reduces the amount of the detectable emission to impair the quality of the image given by the storage panel for single- or double-side reading system. To solve this problem, the inventor further studied and found that an antistatic agent which was not employed in the radiation image storage panel ensures the amount of the detectable emission. The antistatic agent comprises electroconductive acicular fine particles having major and minor axes shorter than those of the conventional one, and hence less absorbs the light in the emission wavelength than the conventional one. Accordingly, it can effectively reduce the surface electric resistivity of the radiation image storage panel without lowering the transmittance of the stimulated emission.

The present invention resides in a radiation image storage panel comprising a stimulable phosphor layer which gives stimulated emission upon irradiation with stimulating rays and a protective film provided thereon, wherein the protective film contains electroconductive acicular fine particles, has a surface electric resistivity of $10^{14}\Omega$ or less, and shows a transmittance of 70% or more at a peak wavelength of the stimulated emission.

The invention further resides in a radiation image storage panel used for a double-side reading system, comprising a back protective film, a transparent support film, an undercoating layer, a stimulable phosphor layer which gives stimulated emission upon irradiation with stimulating rays, and a protective film overlaid in order, wherein at least one layer or film selected from the group consisting of the back protective film, the undercoating layer and the protective film contains electroconductive acicular fine particles, has a surface electric resistivity of $10^{14}\Omega$ or less, and shows a transmittance of 70% or more at a peak wavelength of the stimulated emission.

In the invention, the transmittance of the layer or film containing the acicular fine particles is the total transmittance including loss caused by surface reflection. In the present specification, the "front surface" means the top surface of the stimulable phosphor layer (if a protective film is provided on the phosphor layer, it means the surface of that protective film). The "back surface" means the bottom surface of the phosphor layer (if a support is provided, it means the bottom surface of that support, and further, if a back protective film is provided, it means the bottom surface of that film).

DETAILED DESCRIPTION OF THE INVENTION

The preferred embodiments of the invention are as follows.

(1) The radiation image storage panel, in which the electroconductive acicular fine particle has a major axis of 0.1 to 3 $\mu$m (mean value) and a minor axis of 0.001 to 0.1 $\mu$m, preferably 0.01 to 0.1 $\mu$m (mean value).

(2) The radiation image storage panel, in which the electroconductive acicular fine particles are of a tin oxide compound.

(3) The radiation image storage panel, in which the back protective film, the undercoating layer, and/or the protective film contains the electroconductive acicular fine particles in an amount of 10 to 80 wt. %.

(4) The radiation image storage panel, in which the protective film comprises two or more layers, and at least one layer contains the electroconductive acicular fine particles.

(5) The radiation image storage panel having an undercoating layer which is favorably employable for double-side reading system, in which the undercoating layer contains the electroconductive acicular (in the form of needle) fine particles.

(6) The radiation image storage panel having an undercoating layer in which the undercoating layer shows a reflectance of 30% or less at a peak wavelength of the stimulated emission as well as a wavelength of the stimulating rays, the reflectance being measured on the undercoating layer formed on the support film.

By referring to the attached drawings, the radiation image storage panel of the invention is described below in more detail.

Figure 1:
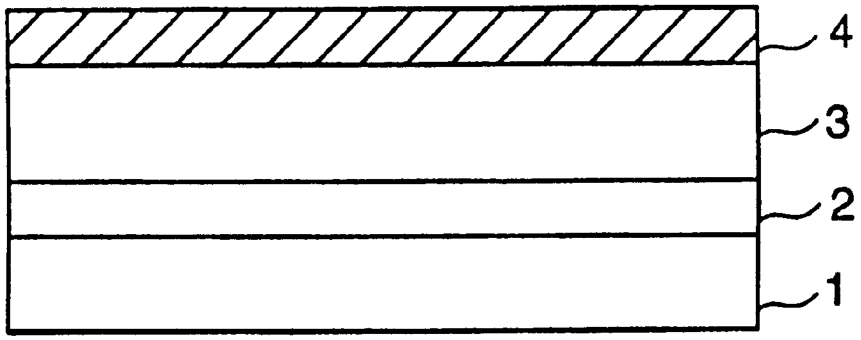
FIG. 1 schematically shows a section of a typical radiation image storage panel of the invention for single-side reading system.

FIG. 1 schematically shows a section of a representative radiation image storage panel of the invention for single-side reading system. The storage panel of FIG. 1 comprises a support film 1, an undercoating layer 2, a stimulable phosphor layer 3, and a protective film 4 in order. The electroconductive acicular fine particles are contained in the protective film 4.

Figure 2:
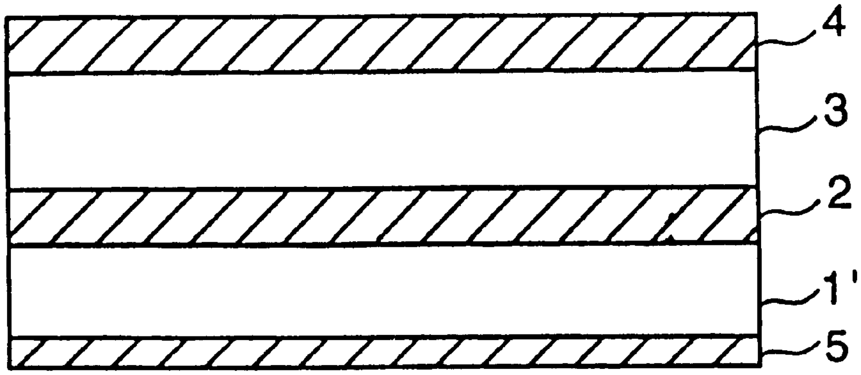
FIG. 2 schematically shows a section of a typical radiation image storage panel of the invention for double-side reading system.

FIG. 2 schematically shows a section of a representative radiation image storage panel of the invention for double-side reading system. The storage panel of FIG. 2 is composed of a back protective film 5, a transparent support 1', an undercoating layer 2, a stimulable phosphor layer 3, and a protective film 4 in order. The electroconductive acicular particles may be contained in any or all of the back protective film 5, the undercoating layer 2, and the protective film 4.

The radiation image storage panel of the invention for double-side reading system can be prepared by the process described below.

The electroconductive acicular fine particles of the invention has a major axis (i.e., length of the fiber) of 0.1 to 3 $\mu$m on average and a minor axis (i.e., diameter of the fiber) of 0.001 to 0.1 $\mu$m on average. Examples of the material for the conductive acicular particles include tin oxide compounds, zinc oxide compounds, and indium oxide compounds. Zinc oxide compounds are particularly preferred. The fibrous fine particles of those compounds serve as an antistatic agent giving both excellent antistatic property and a high optical transmittance (transparency) in a wide wavelength region. The back protective film, the undercoating layer, and/or the protective film may contain the electroconductive acicular fine particles in an amount of 10 to 80 wt. % based on the total weight of the film or layer in which the particles are contained.

In the radiation image storage panel of the invention, the layer or film (back protective film, undercoating layer, or protective film) containing the electroconductive particles have a surface electric resistivity of $10^{14}\Omega$ or less from the viewpoint of antistatic effect. Further, this layer or film also has a transmittance (total transmittance of the layer or film) of 70% or higher at the wavelength of the peak of the stimulated emission, so that the decrease of the amount of the detectable stimulated emission can be reduced. In consideration of image quality, the storage panel for double-side reading system preferably contains the conductive acicular fine particles in the back protective film or the undercoating layer (more preferably in the undercoating layer).

The transparent support film preferably is a transparent plastic material sheet or film. Examples of the plastic materials include polyethylene terephthalate, polyethylene naphthalate, polyamide, polyimide, and aramid resin. However, the material for the support film is not restricted to those examples, and a plastic material having enough strength and high transparency is preferably employed. The thickness of the support film generally is in the range of 10 to 1,000 μm.

On the surface of the support film facing the phosphor layer, an undercoating (adhesive) layer is provided to increase the adhesion between the support film and the phosphor layer or to improve the image quality (sharpness, graininess) of the reproduced radiation image. The undercoating layer can be formed by coating the support surface with a coating solution containing polymer material such as gelatin and flexible acrylic resin. In the case that the electroconductive acicular fine particles are incorporated into the undercoating layer, they may be dispersed in the coating solution in the aforementioned amount. The undercoating layer may contain light-scattering fine particles (e.g., particles of gadolinium oxide, magnesium oxide or titanium oxide). The thickness of the undercoating layer generally is in the range of approx. 1 to 50 μm.

On the undercoating layer, the stimulable phosphor layer is provided.

As the stimulable phosphor, a phosphor giving a stimulated emission of a wavelength in the range of 300 to 500 nm when it is irradiated with stimulating rays of a wavelength in the range of 400 to 900 nm is preferably employed. In Japanese Patent Provisional Publications H2-193100 and H4-310900, some examples of the stimulable phosphor are described in detail. Examples of the preferred phosphors include europium or cerium activated alkaline earth metal halide phosphors, and cerium activated oxyhalide phosphors. They are by no means given to restrict the stimulable phosphor employable in the invention, and any other phosphors can be also employed, provided that they give stimulated emission when excited with a stimulating ray after having been exposed to a radiation.

A representative stimulable phosphor layer in the invention comprises a binder resin and stimulable phosphor particles dispersed therein, and hence the radiation image storage panel of the invention having such phosphor layer is explained below.

The stimulable phosphor layer can be formed, for example, in the following manner which is as such known. First, the phosphor particles and a binder are placed in a solvent, and mixed well to prepare a coating liquid in which the phosphor particles are uniformly dispersed in a binder solution. As the binder, various resin materials are known and optionally usable for the invention. The ratio between the binder and the phosphor in the liquid depends on the characteristics of the phosphor and the aimed property of the storage panel, but generally they are employed at a ratio of 1:1 to 1:100 (binder:phosphor, by weight), preferably 1:8 to 1:40. The coating liquid may further contain various additives such as a dispersing agent (for promoting dispersing of the phosphor particles), a plasticizer (for improving binding between the phosphor particles and the binder), an anti-yellowing agent (for inhibiting yellowing of the phosphor layer), a hardening agent and a crosslinking agent.

The coating liquid thus prepared is evenly coated on a temporary support (e.g., glass plate, metal plate, plastic sheet) by known coating means (such as doctor blade, roll coater, and knife coater), and dried to form a stimulable phosphor sheet. The sheet is then peeled from the temporary support, and placed and fixed (for example, by pressing) on an undercoating layer of a support film to form the stimulable phosphor layer. The thickness of the phosphor layer is designed according to the characteristics of the phosphor, the target property of the storage panel, and the mixing ratio of binder and phosphor, but generally is in the range of 20 μm to 1 mm, preferably 50 μm to 500 μm. The phosphor layer may be formed by directly applying the coating liquid on the undercoating layer of the support film.

The stimulable phosphor layer may consist of agglomerated phosphor particles without binder. Further, the phosphor layer comprising agglomerated phosphor soaked with a polymer is also employable.

On the surface of the phosphor layer opposite to the undercoating layer side, the transparent protective film is formed to keep the phosphor layer from chemical deterioration or physical damage. The protective film can be formed by coating the phosphor layer with a coating solution in which transparent polymer material (such as cellulose derivative, polymethyl methacrylate, and organic solvent-soluble fluorocarbon resin) is dissolved. Otherwise, a transparent film (e.g., glass plate, polymer film) for the protective film may be independently prepared, and overlaid and fixed with an adhesive on the phosphor layer. Further, the protective film may be formed by depositing inorganic material on the phosphor layer. In the case that the electroconductive acicular fine particles are incorporated in the protective film, they may be added and dispersed, for example, in the coating solution in the aforementioned amount. The protective film may further contain various additives such as light-scattering fine particles (e.g., particles of magnesium oxide, zinc oxide or titanium oxide), a lubricant (e.g., powder of perfluoroolefin resin or silicone resin), and a crosslinking agent (e.g., polyisocyanate). The thickness of the protective film generally is in the range of approx. 0.1 to 20 μm.

The protective film of the invention may comprise two or more layers. In that case, the electroconductive acicular particles may be incorporated in any or all of the layers. If the protective film is formed from an adhesive, the layer (adhesive layer) may contain the conductive acicular particles.

On the back surface of the transparent support film (the surface opposite to the phosphor layer side), the back protective film can be provided. The back protective film can be formed from the same material and in the same manner as for the protective film described above, and further the conductive acicular particles can be also incorporated in the same manner. The thickness of the back protective film generally is in the range of approx. 0.1 to 20 μm.

The radiation image storage panel of the invention for single-side reading system can be also prepared in a manner similar to that for double-side reading system. In the panel for single-side reading system, the electro-conductive acicular fine particles are incorporated in the protective film (which is placed on the side for observing the stimulated emission). For improving anti-static property, the undercoating layer may contain the conductive particles. If the phosphor layer is self-supporting, the support may be omitted. In the case that the panel has a support, the support does not have to be transparent. Accordingly, it may be made of any known support material for conventional radiation image storage panels. Between the support and the phosphor layer, various auxiliary layers (e.g., light-reflecting layer comprising light-reflecting material such as titanium oxide, light-absorbing layer comprising light-absorbing material such as carbon black) may be provided. Further, the support may have many small concaves on the surface facing the phosphor layer.

In the manner described above, the radiation image storage panel of the invention can be produced. The radiation image storage panel of the invention may be modified in known manners. For example, for improving sharpness of the resultant image, at least one of the layers or films may be colored with a colorant absorbing not the stimulated emission but the stimulating ray.

The present invention is further described by the following non-limiting examples.

EXAMPLE 1

Radiation Image Storage Panel for Single-side Reading System (1) Preparation of Stimulable Phosphor Sheet Stimulable phosphor: $BaFBr_{0.85}I_{0.15}:EU^{2+}$
(stimulated emission peak: approx. 410 nm) 1,000 g Binder: polyurethane elastomer
(Pandex T-5265H (solid), Dai-Nippon Ink & Chemicals, Inc.) 32 g Crosslinking agent: (polyisocyanate resin,
Colonate HX (solid content: 100),
Nippon Polyurethane Co., Ltd.) 3 g Anti-yellowing agent: (epoxy resin,
Epikote #1001 (solid), Yuka Shell Epoxy Kabushiki Kaisha) 15 g The above-mentioned materials were placed in methyl ethyl ketone, and mixed for 1 hour by means of a propeller mixer (rotation rate: 10,000 r.p.m.) to prepare a coating dispersion having a viscosity of 30 ps at 25° C. (binder/phosphor: 1/20, by weight). The prepared coating dispersion was coated on a temporary support (polyethylene terephthalate sheet having a surface beforehand coated with a silicon releasing agent) of 180 μm thick, and dried to form a coated dry layer. The coated dry layer was then peeled from the temporary support to give a phosphor sheet (thickness: 310 μm, width: 300 mm).

(2) Preparation of Undercoating Layer

A polyethylene terephthalate sheet (thickness: 250 μm, degree of haze (typical): 27; Lumilar S-10, available from Toray Industries, Inc.) provided with a light-shielding layer (thickness: approx. 10 μm) comprising carbon black, silica and a binder on one side surface was prepared. On the other surface of the support film, flexible acrylic resin (Cryscoat P-1018GS, Dai-Nippon Ink & Chemicals, Inc.) was coated by a doctor blade, and dried to give an undercoating layer (thickness: 20 μm).

(3) Preparation of Stimulable Phosphor Layer

On the undercoating layer, the above-prepared stimulable phosphor sheet was placed so that the back surface, which had been in contact with the temporary support in the procedure (1), might be in contact with the undercoating layer. The thus-prepared layered composition was then pressed with heating by means of a calender roll (total weight: 2.5 t, temperature of the upper roll: 45° C., temperature of the lower roll: 45° C., transferring rate: 0.3 m/minute), so that the stimulable phosphor sheet (thickness: 230 μm, density of the phosphor: 3.35 g/cm$^3$) might be completely fixed on the support via the undercoating layer. Thereby, a stimulable phosphor layer was prepared.

(4) Preparation of the Protective Film Containing Electroconductive Material

Electroconductive material: $SnO_2$ (doped with Sb) acicular fine particles
(major axis: 0.2 to 2 μm,
minor axis: 0.01 to 0.02 μm,
FS-10P MEK dispersion [solid content: 30%], Ishihara Industries Co., Ltd.) 22.2 g Fluorocarbon resin: fluoroolefin-vinyl ether copolymer
(Lumiflon LF-504X [30% xylene solution], Asahi Glass Co., Ltd.) 25.4 g Crosslinking agent: polyisocyanate
(Olestar NP38-70S [solid content: 71%],
Mitsui Toatsu Chemicals, Inc.) 3.35 g Slipping agent: silicone modified with alcohol
(X-22-2809 [66% xylene-containing paste], Shin-Etsu Chemical Co., Ltd.) 0.15 g Catalyst: dibutyl tin dilaurate
(KS1260, Kyodo Yakuhin Co., Ltd.) 0.1 mg The above-mentioned materials were placed in 67 g of methyl ethyl ketone to prepare a resin coating liquid in which the electroconductive fine particles were dispersed (viscosity: 3 to 4 ps). Independently, a polyethylene terephthalate film (thickness: 6 μm; Lumilar 6c-F53, Toray Industries, Inc.) provided with a heat-resistant releasable film on one side surface was prepared. On the other side surface of the polyethylene terephthalate film, the resin coating liquid was coated and heated at 120° C. for 20 minutes to dry and harden the coated liquid. Thus, a resin film (thickness: 2 μm) containing conductive acicular fine particles (content: 40 wt. % based on the total solid content) was formed.

From the layered composition of the films, the releasable film was peeled. On the exposed surface (surface opposite to the resin film) of the polyethylene terephthalate film, an adhesive (unsaturated polyester resin solution, Byron 30SS, Toyobo Co., Ltd.) was coated in an amount of 2 g/m$^2$ and dried to from an adhesive layer. The obtained film (comprising the resin film containing the conductive fine particles on one side surface and the adhesive layer on the other surface) was combined to the stimulable phosphor layer via the adhesive layer by means of a laminator roll, to form a protective film consisting of two layers. Thus, a radiation image storage panel of the invention composed of support film, undercoating layer, stimulable phosphor layer, adhesive layer, and protective film containing electroconductive acicular fine particles was prepared.

EXAMPLE 2

The procedure of Example 1 was repeated except that 40.1 g of the electroconductive acicular particles and 42 g of methyl ethyl ketone (solvent) were used to prepare a resin film containing electroconductive acicular particles (content: 55 wt. %, based on the total solid content), to prepare a radiation image storage panel of the invention.

Comparison Example 1

The procedure of Example 1 was repeated except that 4.3 g of ZnO whiskers (electroconductive particles, Panatetra A-1-1, Matsushita Amtec Co., Ltd.) and 82 g of methyl ethyl ketone (solvent) were used to form a resin film containing electroconductive particles (content: 30 wt. %, based on the total solid content), to prepare a radiation image storage panel for comparison.

Comparison Example 2

The procedure of Example 1 was repeated except that 8.2 g of ZnO whiskers (electroconductive particles) and 82 g of methyl ethyl ketone (solvent) were used to form a resin film containing electroconductive particles (content: 45 wt. % based on the total solid content), to prepare a radiation image storage panel for comparison.

EXAMPLE 3

Radiation Image Storage Panel for Double-side Reading System (1) Preparation of Stimulable Phosphor Sheet A coating dispersion for preparing the stimulable phosphor sheet was prepared in the same manner as in Example 1. The coating dispersion was evenly coated on a temporary support (polyethylene terephthalate sheet having a surface beforehand coated with silicon releasing agent) of 180 μm thick by a doctor blade, and dried to form a dry layer. The dry layer thus formed was then peeled from the temporary support to give a phosphor sheet (thickness: 220 μm, width: 300 mm). The procedure was repeated to obtain two phosphor sheets.

(2) Preparation of Undercoating Layer

A polyethylene terephthalate sheet (thickness: 250 μm, degree of haze (typical): 27; Lumilar S-10, Toray Industries, Inc.) was used as a transparent support. On one side surface of the sheet, an undercoating layer was formed in the same manner as in Example 1.

(3) Preparation of Stimulable Phosphor Layer

On the undercoating layer, one of the above-prepared stimulable phosphor sheets was placed so that the front surface, which had not been in contact with the temporary support in the procedure (1), was brought into contact with the undercoating layer. Thus prepared composite was then pressed under heating by means of a calender roll (metal roll, roll diameter: 200 mm, total weight: 1.6 t, temperature of the upper roll: 45° C., temperature of the lower roll: 45° C., transferring rate: 0.3 m/minute), so that the pressed phosphor sheet was provided on the undercoating layer.

On the pressed phosphor sheet, the other phosphor sheet was placed so that the back surface, which had been in contact with the temporary support in the procedure (1), was brought into contact with the pressed phosphor sheet. Thus prepared composite was then pressed under heating by means of a calender roll (total weight: 2.5 t, temperature of the upper roll: 45° C., temperature of the lower roll: 45° C., transferring rate: 0.3 m/minute), so that the stimulable phosphor sheets (total thickness: 320 μm, density of the phosphor: 3.35 g/$cm^3$) was well fixed on the support film via the undercoating layer.

(4) Preparation of Protective Film Containing Electroconductive Material

The protective film containing conductive material was prepared in the same manner as in Example 1. The film consisted of two layers.

(5) Preparation of Back Protective Film

Fluorocarbon resin: fluoroolefin-vinyl ether copolymer 25.4 g

Crosslinking agent: polyisocyanate 3.35 g

Lubricant: silicone modified with alcohol 0.15 g

Catalyst: dibutyl tin dilaurate 0.1 mg

The above-mentioned materials were placed in 82.5 g of methyl ethyl ketone to prepare a coating solution (viscosity: 3 to 4 cps). The coating solution was coated on the surface of the support film opposite to the phosphor layer, and heated at 120° C. for 20 minutes to dry and harden the coated solution. Thus, a back protective film (thickness: 2 μm) was formed.

There was produced a radiation image storage panel of the invention comprising back protective film, transparent support, undercoating layer, stimulable phosphor layer, adhesive layer, and protective film containing electroconductive acicular fine particles.

EXAMPLE 4

The procedure of Example 3 was repeated except that 40.1 g of the electroconductive acicular particles and 42 g of methyl ethyl ketone (solvent) were used to prepare a resin film containing electroconductive acicular particles (content: 55 wt. %, based on the total solid content), to prepare a radiation image storage panel of the invention.

Comparison Example 3

The procedure of Example 3 was repeated except that 4.3 g of ZnO whiskers (electroconductive particles) and 82 g of methyl ethyl ketone (solvent) were used to form a resin film containing electroconductive particles (content: 30 wt. % based on the total solid content), to prepare a radiation image storage panel for comparison.

Comparison Example 4

The procedure of Example 3 was repeated except that 8.2 g of ZnO whiskers (electroconductive particles) and 82 g of methyl ethyl ketone (solvent) were used to form a resin film containing the conductive particles (content: 45 wt. %, based on the total solid content), to prepare a radiation image storage panel for comparison.

EXAMPLE 5

Radiation Image Storage Panel for Double-side Reading System

The procedure of Example 3 was repeated except that the undercoating layer and the protective film were formed in the following manners (2) and (4), respectively, to produce a radiation image storage panel of the invention. The storage panel was composed of back protective film, transparent support, undercoating layer containing conductive acicular fine particles, stimulable phosphor layer, adhesive layer, and protective film.

(2) Preparation of Undercoating Layer Containing Electro-conductive Material

Electroconductive material: $SnO_2$ (doped with Sb) acicular particles
(major axis: 0.2 to 2 μm,
minor axis: 0.01 to 0.02 μm,
FS-10P MEK dispersion [solid content: 30%],
Ishihara Industries Co., Ltd.) 33.3 g Unsaturated polyester resin:
20% methyl ethyl ketone solution (Byron 300, Toyobo Co., Ltd.) 50 g The above-mentioned materials were placed in 52 g of methyl ethyl ketone to prepare a coating liquid in which electroconductive fine particles was dispersed (viscosity: approx. 0.2 to 0.3 ps). On one side surface of the transparent support, the coating liquid was coated by a doctor blade, and dried to form an undercoating layer (thickness: 2 μm) containing electroconductive acicular fine particles (content: 50 wt. %, based on the total solid content). The undercoating layer on the transparent support was measured on its reflectance at 410 nm (peak wavelength of the stimulated emission) and at 633 nm (wavelength of the stimulating rays). The reflectance was 27% at 410 nm and 18% at 633 nm.

(4) Preparation of Protective Film

Fluorocarbon resin: fluoroolefin-vinyl ether copolymer 25.4 g

Crosslinking agent: polyisocyanate 3.35 g

Lubricant: silicone modified with alcohol 0.15 g

Catalyst: dibutyl tin dilaurate 0.1 mg

The above-mentioned materials were placed in 82.5 g of methyl ethyl ketone to prepare a coating solution (viscosity: 3 to 4 cps). The procedure of Example 1 was then repeated except for using thus prepared coating solution, to prepare a protective film consisting of two layers.

EXAMPLE 6

The procedure of Example 5 was repeated except that 50 g of the electroconductive acicular particles and 40 g of methyl ethyl ketone (solvent) were used to form an undercoating layer containing electroconductive acicular particles (content: 60 wt. %, based on the total solid content), to prepare a radiation image storage panel of the invention.

Comparison Example 5

The procedure of Example 5 was repeated except that the undercoating layer containing electroconductive particles (content: 30 wt. % based on the total solid content) was formed from a coating liquid prepared by adding the following materials to 75 g of methyl ethyl ketone.

Electroconductive material: ZnO whiskers 4.3 g

Soft acrylic resin (Cryscoat P-1018GS [solid content: 20%], Dai-Nippon Ink & Chemicals, Inc.) 50 g Thus, a radiation image storage panel for comparison was produced.

Comparison Example 6

The procedure of Example 5 was repeated except that the undercoating layer containing electroconductive particles (content: 45 wt. % based on the total solid content) was formed from a coating liquid prepared by adding the following materials to 75 g of methyl ethyl ketone.

Electroconductive material: ZnO whiskers 8.2 g

Soft acrylic resin 50 g

Thus, a radiation image storage panel for comparison was produced.

Before the stimulable phosphor layer was formed on the undercoating layer in the preparation of the radiation image storage panel, the undercoating layer on the transparent support was measured on its reflectance at 410 nm (peak wavelength of the stimulated emission) and at 633 nm (wavelength of the stimulating rays). The reflectance was 61% at 410 nm and 53% at 633 nm.

EXAMPLE 7

Radiation Image Storage Panel for Double-side Reading System

The procedure of Example 3 was repeated except that the protective film and the back protective film were formed in the following manners (4) and (5), respectively, to produce an image storage panel of the invention. The storage panel was composed of back protective film containing electroconductive acicular fine particles, transparent support, undercoating layer, stimulable phosphor layer, adhesive layer, and protective film.

(4) Preparation of Protective Film

A protective film was formed in the same manner as in Example 5.

(5) Preparation of Back Protective Film Containing Electroconductive Material

A resin coating liquid in which electroconductive fine particles were dispersed was prepared in the same manner as in Example 1. The procedure of Example 3 was then repeated except for using the resin coating liquid, to form a back protective film (thickness: 2 μm) containing electroconductive acicular fine particles (content: 40 wt. %, based on the total solid content) on the back surface of the support film.

EXAMPLE 8

The procedure of Example 7 was repeated except that 40.1 g of the electroconductive acicular particles and 42 g of methyl ethyl ketone (solvent) were used to form a back protective film containing electroconductive acicular fine particles (content: 55 wt. %, based on the total solid content), to produce a radiation image storage panel of the invention.

Comparison Example 7

The procedure of Example 7 was repeated except that 4.3 g of ZnO whiskers (conductive particles) and 82 g of methyl ethyl ketone (solvent) were used to form a back protective film containing electroconductive fine particles (content: 30 wt. %, based on the total solid content), to produce a radiation image storage panel for comparison.

Comparison Example 8

The procedure of Example 7 was repeated except that 8.2 g of ZnO whiskers (conductive particles) and 82 g of methyl ethyl ketone (solvent) were used to form a back protective film containing electroconductive fine particles (content: 45 wt. %, based on the total solid content), to produce a radiation image storage panel for comparison.

The surface electric resistivity, the transmittance, and the amount of stimulated emission given by each prepared radiation image storage panel were measured.

(a) Surface Electric Resistivity

The surface electric resistivity of the layer (film) containing electroconductive material in the storage panel was measured by means of a combination of a disc electrode (P-601, Kawaguchi Denki-Seisakusho Co., Ltd) and a megohm meter (Supermegohim meter EV-40, Kawaguchi Denki-Seisakusho Co., Ltd). The measurement was carried out at the temperature of 23° C. and the humidity of 53%RH.

(b) Transmittance

With respect to the layer (film) containing electroconductive material in the storage panel, the total transmittance at 410 nm was measured by a spectrophotometer. The total transmittance includes a loss caused by surface reflection. In the case that the conductive particles were incorporated in the protective film, the transmittance of the resin film containing the particles was measured.

(c) Amount of Stimulated Emission

After the radiation image storage panel was exposed to X-rays (generated under 80 kVp), the stimulable phosphor in the storage panel was excited with He-Ne laser (wavelength: 632.8 nm). The stimulated emission from the front surface of the storage panel was detected, and converted into electric signals. Based on the electric signals, a relative amount of the stimulated emission was obtained and corrected so that the amount of the exposed X-rays could be regarded as a constant value. In the case that the storage panel was for double-side reading system, the relative amount of the emission from the back surface was also measured and added to that obtained from the front surface. Thus, the total amount of the stimulated emission was obtained.

The results are set forth in Tables 1 and 2.

TABLE 1

| | electroconductive material | | | | |
|---|---|---|---|---|---|
| panel*1 | layer | content wt. % | R*2/Ω | TR*3/% | F. Em*4 |
| Ex. 1 | protective film | 40 | $10^{13}$ | 82 | 100 |
| C. Ex. 1 | protective film | 30 | $10^{13}$ | 67 | 88 |
| Ex. 2 | protective film | 55 | $10^{8}$ | 76 | 93 |
| C. Ex.2 | protective film | 45 | $10^{8}$ | 61 | 80 |

Remarks)
*1panel for single-side reading system,
*2surface electric resistance,
*3transmittance, and
*4relative amount of the stimulated emission from the front surface

TABLE 2

| | conductive material | | | | stimulated emission | | |
|---|---|---|---|---|---|---|---|
| panel*1 | layer | content/ wt. % | R*2/ Ω | TR*3/ % | front*4 | back*5 | total*6 |
| Ex. 3 | PR film*7 | 40 | $10^{13}$ | 82 | 108 | 40 | 148 |
| C. Ex. 3 | PR film*7 | 30 | $10^{13}$ | 67 | 94 | 36 | 130 |
| Ex. 4 | PR film*7 | 55 | $10^{8}$ | 74 | 98 | 37 | 135 |
| C. Ex. 4 | PR film*7 | 45 | $10^{8}$ | 61 | 86 | 34 | 120 |
| Ex. 5 | UC layer*8 | 50 | $10^{13}$ | 89 | 118 | 45 | 163 |
| C. Ex. 5 | UC layer*8 | 30 | $10^{13}$ | 68 | 117 | 35 | 152 |
| Ex. 6 | UC layer*8 | 60 | $10^{8}$ | 86 | 117 | 42 | 159 |
| C. Ex. 6 | UC layer*8 | 45 | $10^{8}$ | 62 | 118 | 31 | 149 |
| Ex. 7 | BPR film*9 | 40 | $10^{13}$ | 82 | 118 | 44 | 162 |
| C. Ex. 7 | BPR film*9 | 30 | $10^{13}$ | 67 | 118 | 35 | 153 |
| Ex. 8 | BPR film*9 | 55 | $10^{8}$ | 76 | 117 | 43 | 160 |
| C. Ex. 8 | BPR film*9 | 45 | $10^{8}$ | 61 | 118 | 31 | 149 |

Remarks)
*1panel for double-side reading system
*2surface electric resistance
*3transmittance
*4relative amount of the stimulated emission from the front surface
*5relative amount of the stimulated emission from the back surface
*6total relative amount of the stimlated emission
*7protective film
*8undercoating layer
*9back protective film The results in Tables 1 and 2 indicate the following facts.

The layer (or film) containing the specific electroconductive material in each radiation image storage panel of the invention (Examples 1–8) exhibits a relatively high transmittance at the wavelength of the peak of the stimulated emission, under the condition that the surface electric resistivity is set at the same level as that in the conventional radiation image storage panel. Consequently, the amount of the detected stimulated emission is remarkably increased in the radiation image storage panel of the invention for single-side reading system (i.e., panel of Example 1 or 2), as compared with the conventional radiation image storage panel. On the other hand, in the radiation image storage panels of the invention for double-side reading system (i.e., storage panels of Examples 3 to 8), the total amount of the detected emission is remarkably increased as compared with a conventional radiation image storage panel. If the specific electroconductive acicular fine particles are incorporated into the protective film, the amount of the emission detected from the front surface is increased.

If the specific electroconductive particles are incorporated into the undercoating layer or the back protective film, the amount of the emission detected from the back surface is increased. In particular, the latter storage panel (which has the undercoating layer or the back protective film containing the specific electroconductive acicular particles) is preferred, because it enables to detect a large amount of the stimulated emission in total.

What is claimed is:

1. A radiation image storage panel comprising a stimulable phosphor layer which gives stimulated emission upon irradiation with stimulating rays and a protective film provided thereon, wherein the protective film contains electroconductive acicular fine particles, has a surface electric resistivity of $10^{14}\Omega$ or less, and shows a transmittance of 70% or more at a peak wavelength of the stimulated emission.

2. The radiation image storage panel of claim 1, wherein the electroconductive acicular fine particles have a major axis of 0.1 to 3 $\mu$m on average and a minor axis of 0.001 to 0.1 $\mu$m on average.

3. The radiation image storage panel of claim 1, wherein the electroconductive acicular fine particles are of a tin oxide compound.

4. The radiation image storage panel of claim 1, wherein the protective film contains the electroconductive acicular fine particles in an amount of 10 to 80 wt. %.

5. The radiation image storage panel of claim 1, wherein the protective film comprises two or more layers, and at least one layer contains the electroconductive acicular fine particles.

6. The radiation image storage panel of claim 1, comprising a support film, an undercoating layer, the stimulable phosphor layer and the protective film over-laid in order.

7. The radiation image storage panel of claim 6, wherein the undercoating layer further contains the electroconductive acicular fine particles.

8. A radiation image storage panel used for a double-side reading system, comprising a back protective film, a transparent support film, an undercoating layer, a stimulable phosphor layer which gives stimulated emission upon irradiation with stimulating rays, and a protective film overlaid in order, wherein at least one layer or film selected from the group consisting of the back protective film, the undercoating layer and the protective film contains electroconductive acicular fine particles, has a surface electric resistivity of $10^{14}\Omega$ or less, and shows a transmittance of 70% or more at a peak wavelength of the stimulated emission.

9. The radiation image storage panel of claim 8, wherein the electroconductive acicular fine particles have a major axis of 0.1 to 3 $\mu$m on average and a minor axis of 0.001 to 0.1 $\mu$m on average.

10. The radiation image storage panel of claim 8, wherein the electroconductive acicular fine particles are of a tin oxide compound.

11. The radiation image storage panel of claim 8, wherein at least one of the back protective film, the undercoating layer and the protective film contains the electroconductive acicular fine particles in an amount of 10 to 80 wt. %.

12. The radiation image storage panel of claim 8, wherein the undercoating layer contains the electroconductive acicular fine particles.

13. The radiation image storage panel of claim 12, wherein the undercoating layer shows a reflectance of 30% or less at a peak wavelength of the stimulated emission as well as a wavelength of the stimulating rays, the reflectance being measured on the undercoating layer formed on the support film.

14. The radiation image storage panel of claim 8, wherein the protective film comprises two or more layers, and at least one layer contains the electroconductive acicular fine particles.

* * * * *